United States Patent [19]

Latsch

[11] 4,361,122

[45] Nov. 30, 1982

[54] INTERNAL COMBUSTION ENGINE WITH EXTERNALLY-SUPPLIED IGNITION, HAVING ONE MAIN COMBUSTION CHAMBER PER CYLINDER AND ONE IGNITION CHAMBER

[75] Inventor: Reinhard Latsch, Vaihingen, Fed. Rep. of Germany

[73] Assignee: Robert Bosch GmbH, Stuttgart, Fed. Rep. of Germany

[21] Appl. No.: 207,050

[22] Filed: Nov. 14, 1980

[30] Foreign Application Priority Data

Dec. 19, 1979 [DE] Fed. Rep. of Germany ....... 2951029

[51] Int. Cl.³ .......................... F02B 23/00; F02P 1/00
[52] U.S. Cl. .................................... 123/266; 123/254; 123/293; 123/287; 165/51
[58] Field of Search ............... 123/266, 254, 281, 287, 123/291, 292, 293; 165/51

[56] References Cited

U.S. PATENT DOCUMENTS

| | | | |
|---|---|---|---|
| 1,790,892 | 2/1931 | Adams | 123/293 |
| 1,907,095 | 5/1933 | Adams | 123/293 |
| 2,528,081 | 10/1950 | Rodnesky | 123/266 |
| 3,954,093 | 5/1976 | Hughes | 123/266 |
| 4,013,047 | 3/1977 | Harned | 165/51 |
| 4,224,980 | 9/1980 | Buchner | 165/51 |
| 4,265,201 | 5/1981 | Gerry | 123/266 |
| 4,300,497 | 11/1981 | Webber | 123/292 |
| 4,305,357 | 12/1981 | Scherenberg et al. | 123/254 |

FOREIGN PATENT DOCUMENTS

| | | | |
|---|---|---|---|
| 841302 | 5/1939 | France | 123/291 |
| 54-55209 | 2/1979 | Japan | 123/287 |

*Primary Examiner*—P. S. Lall
*Attorney, Agent, or Firm*—Edwin E. Greigg

[57] ABSTRACT

An internal combustion engine with externally supplied ignition is proposed, in which besides a main combustion chamber an ignition chamber is provided, which communicates with the main combustion chamber via a central discharge channel, which is disposed coaxially with the axis of the ignition chamber, and via additional discharge channels distributed about this discharge channel. Protruding into the coaxially disposed overflow channel is an electrode extending through the ignition chamber, this electrode being embodied as a heat pipe and forming a spark gap with the wall of the ignition chamber in the region of the overflow channel. As a result of its embodiment as a heat pipe, the electrode is protected against excessive heating and is simultaneously held to an optimal temperature.

11 Claims, 5 Drawing Figures

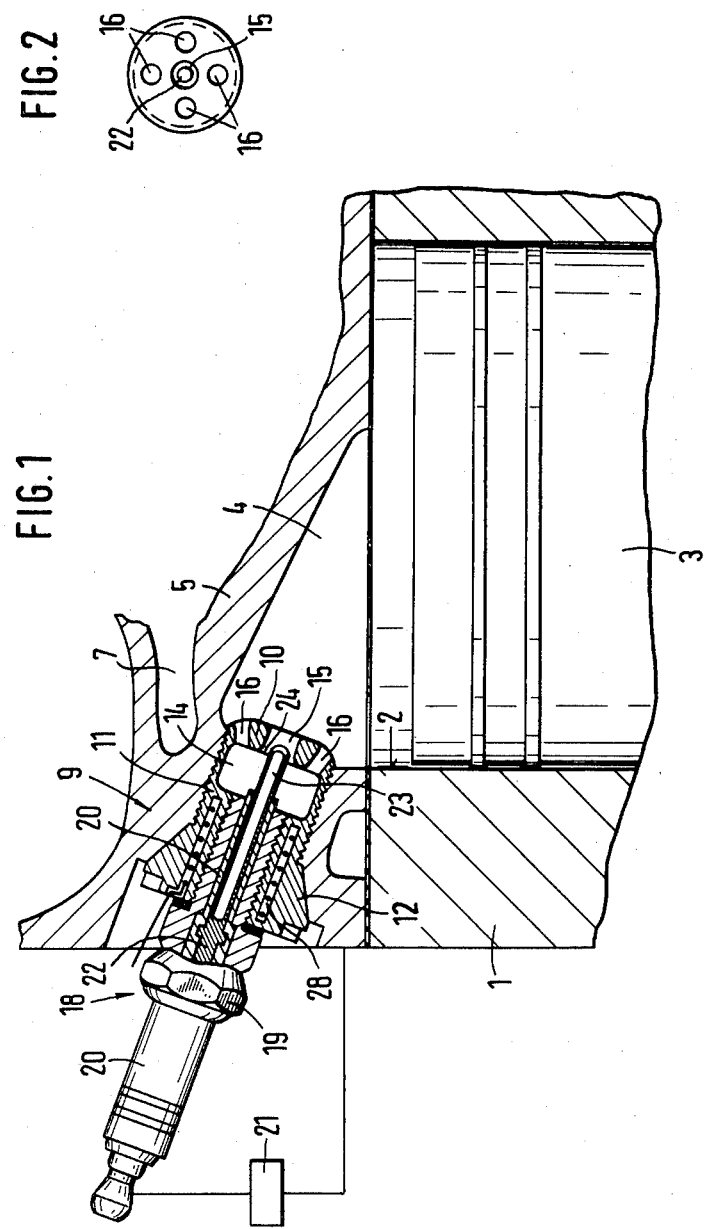

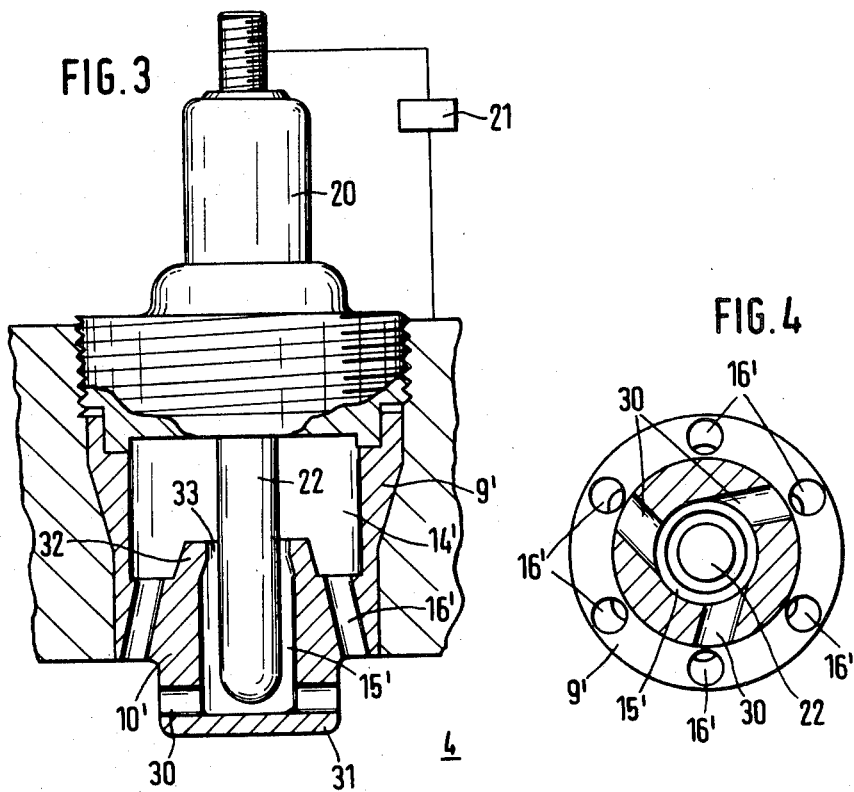
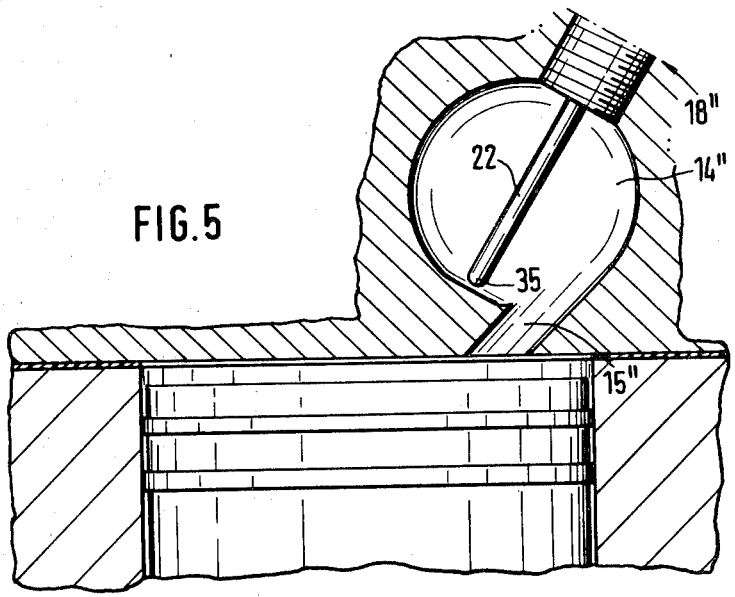

INTERNAL COMBUSTION ENGINE WITH EXTERNALLY-SUPPLIED IGNITION, HAVING ONE MAIN COMBUSTION CHAMBER PER CYLINDER AND ONE IGNITION CHAMBER

BACKGROUND OF THE INVENTION

The invention is based on an internal combustion engine with externally-supplied ignition. In known internal combustion engines of this kind, if they are operated with a fuel-air mixture which is kept as lean as possible or with a conventional fuel-air mixture where a relatively large quantity of recirculated exhaust gas is present, and this mixture must be externally ignited, then there is the danger that the mixture may ignite poorly. In order to attain both satisfactory, reliable ignition and the reaction of the fuel and air with one another while the fuel component is as small as possible, attempts have been made in various ways, having generally to do with attaining a mixture enrichment close to the ignition location in an ignition chamber by means of layering. By increasing the temperature level of the mixture at the ignition location and by taking measures which effect the greatest possible freedom from residual gas on the part of the mixture to be ignited, a high degree of fuel-air mixture leaning can also be attained, while providing both a favorable exhaust gas composition and good utilization of the fuel.

In a known embodiment, the middle and ground electrodes of the ignition apparatus are carried directly up to the inside discharging point of the overflow channel, so that the ignition spark is created directly in the highly turbulent flow region of the inflowing fresh mixture made up of fuel and air. This position for the electrodes has the advantage, on the one hand, of a high degree of freedom from residual gas on the part of the mixture to be ignited and, on the other hand, of a high temperature level at the ignition location. The ignition reliability of this apparatus is thus very great; however, the service life of such electrodes is quite short, because of the thermal stress imposed by the combustion gases flowing in and out (see German Offenlegungsschrift No. 25 03 811).

OBJECT AND SUMMARY OF THE INVENTION

The internal combustion engine according to the invention has the advantage over the prior art that the ignition location is shifted still further into a region of the ignition chamber which is not affected by the residual gases contained in the ignition chamber. The particular embodiment of the middle electrode, which together with the wall of the ignition chamber forms the spark gap, assures that there will be sufficiently high electrode stability. Furthermore, the spark plug, whose temperature is regulated with the aid of the heat pipe, also serves in an advantageous manner to warm up the fresh fuel-air mixture flowing into the ignition chamber. With an electrode of this kind, the effect of the middle electrode which otherwise conventionally occurs, that is, that it conducts heat away from the mixture, can be avoided.

As a result of the characteristics disclosed, advantageous modifications of and improvements to the revelation disclosed can be attained.

The invention will be better understood and further objects and advantages thereof will become more apparent from the ensuing detailed description of three preferred embodiments taken in conjunction with the drawings.

BRIEF DESCRIPTION OF THE DRAWINGS

FIG. 1 is a cross section taken through a first exemplary embodiment of the invention;

FIG. 2 is an end view of the ignition chamber insert shown in FIG. 1;

FIG. 3 shows an enlarged view of a second exemplary embodiment;

FIG. 4 is a section on line 4—4 of FIG. 3 through the embodiment shown in FIG. 3; and FIG. 5 shows a cross-sectional view of a third exemplary embodiment in simplified form.

DESCRIPTION OF THE PREFERRED EMBODIMENTS

In FIG. 1, a section through one cylinder of an internal combustion engine is shown in part. In the cylinder block 1, there is a cylinder bore 2, in which a piston 3 is disposed which in a known manner encloses in the cylinder 2 a main combustion chamber 4. This combustion chamber 4 is supplied with a fuel-air mixture by way of an intake line, not shown, whose inlet opening into the main combustion chamber 4 is controlled by an inlet valve. An outlet valve, also not shown, serves in the conventional manner to control the expulsion of the products of combustion from the main combustion chamber. A cylinder head 5 closes off the cylinder 2 and the valves mentioned above are disposed in it in a conventional manner. The portions of the cylinder block 1 and of a cylinder head 5 which adjoin the main combustion chamber 4 and the cylinder bore 2 are cooled in a known manner, for instance by fluid which flows through appropriate cavities 7 in these portions.

An ignition chamber insert 9 is inserted into the wall of the cylinder head 5 which defines the main combustion chamber 4. This insert 9 is substantially rotationally symmetrical in embodiment and its end face 10 protrudes into the main combustion chamber 4.

The ignition chamber insert 9 comprises a circular-cylindrical portion 11, which has a screw thread on its jacket with which the ignition chamber insert 9 can be threaded into the wall of the cylinder head 5, and a conical portion 12 which adjoins the circular-cylindrical portion 11. The jacket of this conical portion 12 is embodied as a sealing surface, by means of which the communication between the main combustion chamber and the outside is tightly sealed. In the region of the circular-cylindrical portion 11, the ignition chamber insert 9 has a circular-cylindrical cavity which acts as an ignition chamber 14. In the end wall 10 of this ignition chamber 14 on the side toward the combustion chamber, an overflow channel 15 is provided coaxially with the axis of the ignition chamber insert 9 or of the ignition chamber 14. The overflow channel 15 is surrounded by additional overflow channels 16, which likewise penetrate the end wall toward the combustion chamber. Four channels which are symmetrically disposed relative to one another can be provided, by way of example, as the overflow channels 16, as can be seen in the end view of FIG. 2.

A spark ignition device 18 is inserted from the outside, coaxially with the axis of the ignition chamber insert 9. This spark ignition device 18 is embodied like a spark plug, having a housing 19 which can be threaded into the ignition chamber insert 9, an insulating body 20 fixed within this housing 19, and a middle electrode 22 which can be connected outside the engine to a voltage source 21; this middle electrode 22 passes through the insulating body 20, coaxially with the axis of the ignition chamber insert 9. The middle electrode 22 acts as a first electrode of the spark ignition device 18 and protrudes all the way through the ignition chamber 14 and into the overflow channel 15. In that location, the middle electrode 22 is at its shortest distance from the wall of the ignition chamber 14, so that when voltage is applied to the middle electrode, the ignition spark jumps the gap at this point.

The portion of the middle electrode 22 passing through the ignition chamber insert 9 is embodied as a so-called heat pipe, and to this end it has a hollow chamber 23, the walls of which can be provided with a lining to form capillary cavities. The hollow chamber 23 is filled with a small quantity of a vaporizable medium, whose temperature of vaporization determines the onset point for the operation of the heat pipe; this temperature of vaporization thus also fixes the maximum electrode temperature which it is intended to maintain with the aid of the heat pipe. As a filling medium, sodium or potassium may be used, for instance, with which an approximately constant temperature of 500° C. can be maintained at the electrode. As such, the ignition chambers and the electrodes are operated below the glow-ignition temperature so that glow-ignitions do not occur and the instant of ignition can be controlled externally.

With the ignition chamber insert 9 according to the invention, a combustion process which is known per se is performed, in which the main combustion chamber is supplied with a relatively lean fuel-air mixture, or with a conventional fuel-air mixture the main combustion chamber is supplied with a relatively larger quantity of recirculated exhaust gas, which is forced into the ignition chamber 14 via the overflow channels 15 and 16 during the compression stroke of the piston 3. There, during the process of forcing the charge into the combustion chamber, the residual gas remaining from the expansion stroke of the engine is compressed and forced into the portion of the ignition chamber 14 which is remote from the main combustion chamber 4. As a result, what is found in the region of the spark gap 24 between the electrode tip 23 and the wall of the overflow channel 15 is the fuel-air mixture of the main combustion chamber which is relatively free of residual gas. Because of the good warmup conditions in the ignition chamber, the lean fuel-air mixture which enters this chamber is warmed, thus being made better capable of ignition than the mixture located in the main combustion chamber. This warmup effect is especially pronounced at the middle electrode 22, so that the ignitability of the mixture in the region of the spark gap 24 is substantially improved. After the ignition of the mixture, with the aid of the ignition spark, the mixture located in the ignition chamber 14 is expelled, as a result of the expansion, through the discharge channels into the main combustion chamber in the form of streams of flame. With the aid of these streams of flame, the lean mixture located in the main combustion chamber is then ignited.

As a result of the position of the electrode relative to the overflow channel, a reliable ignition of the primary charge occurs even in the lower ranges of engine rpm, load or output, as well as at high air numbers (lambda), in comparison with conventional internal combustion engines. As a result, clear advantages can be attained with respect to engine smoothness and fuel consumption. In addition, there is little inclination to knocking in engines of this kind. With the aid of a middle electrode embodied as a heat pipe, even the extreme heat stresses which occur in the region of the ignition location can be managed successfully. In a known manner, a heat pipe has a vaporization region and a condensation region, which can be separated from one another by a heat-transfer region of greater or lesser dimensions. In the present case, the portion of the middle electrode 22 which protrudes into the ignition chamber is understood to be a vaporization region, while the portion of the middle electrode extending within the remaining portion of the ignition chamber insert 9 is designed as a condensation region. This condensation region is substantially longer than the vaporization region for the sake of better heat exchange and the lengths of the heat pipe is several times as long as the diameter of the heat pipe. In the vaporization region, at least a portion of the charge of the heat pipe is converted into the vapor state by the heat which is present there, so that the vapor fills up the entire hollow chamber 23. By means of withdrawing heat in the condensation region, vapor is converted back into the liquid state in the condensation region, and because of the capillary action of the lining of the heat pipe the liquid is carried back again, in every position of the ignition chamber insert, to the vaporization side. The temperature for cooling purposes at which the heat pipe conducts heat to an increased degree away from the tip 23 away to the insulator absorbing the heat is below the auto-ignition temperature of the operating mixture.

The insulating body 20 surrounding the electrode is embodied with walls as thin as possible in the region of the condensation zone of the heat pipe, so that there is better heat conduction away from the massive portion of the ignition chamber insert and toward the adjoining, cooled cylinder head 5. The conical portion 12 furnishes an intensive contact between the ignition chamber insert 9 and the cylinder head 5. As long as the middle electrode is still cold, almost no heat is carried away by the heat pipe in the middle electrode, because the hollow chamber 23 has an insulating effect as long as the heat pipe is not functioning—that is, as long as the charge of the heat pipe is not vaporizing because the ambient temperature is still too low. As a result of this insulating effect, however, the portion of the middle electrode 22 which protrudes into the ignition chamber 14 is warmed more rapidly than would be the case with an electrode without a heat pipe, and is brought rapidly to the optimal operating temperature. A plurality of discharge channels offers the advantage that the entire charge of the ignition chamber does not need to flow past the middle electrode, which would cause an extremely high flow velocity in this region, with an unfavorable effect on the ignition. In addition, a plurality of ignition flames are created for igniting the main charge, which effects an advantageous rapid combustion of the charge. Furthermore, in the illustrated arrangement, only a small portion of the fresh mixture which has been forced in is warmed up at the middle electrode; as a result, the level of ignitability for a fuel-poor mixture is reached soon after the engine is started (that is, at low load).

At the location at which the spark jumps the spark gap, the wall is embodied as thicker in order to increase the stability of the electrode 22. The electrode 22 can also be connected to ground, in order to reduce the wear caused by spark erosion.

In a further modification of the invention, a heating coil 28 can be provided in the ignition chamber insert 9, alongside the vaporization portion of the heat pipe. If the engine or the middle electrode 22 is still cold, this heating coil 28 serves to heat the electrode 22. The heat pipe 23 then also assures the transfer of heat to the portion of the electrode which protrudes into the ignition chamber 14.

FIG. 3 illustrates a different form of embodiment for the solution according to the invention shown in FIG. 1. Here, again, an ignition chamber insert 9' is shown having its end face 10 protruding into the combustion chamber 4. The ignition chamber insert 9' contains an ignition chamber 14', through which the middle electrode 22, embodied as a heat pipe, extends. As in the previous exemplary embodiment, the middle electrode is embedded in an insulating body 20 and is connected at its outer end with a voltage source 21, through which the electrode is supplied with the ignition voltage. Deviating from the exemplary embodiment of FIG. 1, the end wall 10' which extends toward the combustion chamber is embodied as thicker, so that it is possible for the discharge channel 15', which is also provided in this example and is again disposed coaxially with the axis of the ignition chamber insert or of the electrode 22, to branch out into a plurality of partial channels 30. These partial channels branch off laterally from the discharge channel 15', and in turn discharge into the main combustion chamber 4. The discharge channel 15' here has substantially the form of a blind bore leading out of the ignition chamber 14'. The partial channels 30 are located in a plane which is perpendicular to the axis of the overflow channel 15' and branch off tangentially therefrom at its outermost end, as can be seen from the sectional view of FIG. 4 that is taken on line 4—4 of FIG. 3. In the region of the discharge channel 15', the end face 10' of the ignition chamber insert is embodied as being thicker, taking a form such that the end face 10' has a head 31 protruding into the main combustion chamber 4. On the side remote from the head 31, that is, the side defining the ignition chamber 14', the end face or area 10' has a sleeve 32 which protrudes up into the ignition chamber 14' and reduces the diameter of the overflow channel 15' at this point. The middle electrode 22 now protrudes through the sleeve 32 into the discharge channel 15' and in fact almost up to the end of the discharge channel 15'. The narrowest distance from the wall of the ignition chamber insert 9' is now located between the sleeve 32 and the middle electrode 22, so that the spark gap 33 is formed at that point.

Additional discharge channels 16' are furthermore provided and arranged to exit into the main combustion chamber 4 in the annular field of the end face 10' which surrounds the head 31. As may be seen from the sectional view in FIG. 4 through the ignition chamber insert 9' in the plane of the partial channels 30, six additional overflow channels 16' are distributed symmetrically about the overflow channel 15'. In the case of three of these discharge channels 16', the axis of the additional discharge channel is located in the same plane as the axis of the particular partial channel 30 associated with it.

As a result of this embodiment, in a fashion similar to the embodiment of FIG. 1, only a portion of the fresh mixture to be forced into the ignition chamber 14' is carried past the middle electrode 22, which is embodied as a heat pipe, and is thus warmed thereby. After passing a warmup area, which is located between the discharge point of the partial channels into the discharge channel 15' and the spark gap, the fuel-air mixture is ignited by a spark in the region of the spark gap when voltage is applied. With the described embodiment, the pre-warming area can be enlarged and/or the pre-warming duration can be increased in comparison with the embodiment of FIG. 1; this causes an increased amount of heat to be given up to the portion of the mixture which is to be ignited. With the aid of the tangentially discharging partial channels, a vortex flow is set up, which causes an increase in the convective transfer of heat and increases the dwell time of the mixture at the middle electrode 22. The specialized arrangement of the additional discharge channels 16' relative to the course of the partial channels 30 results in an intensive flame nucleus formation after the ignition of the mixture in the ignition chamber 14'. This means that there is an improvement in the ignitability of the remaining mixture still located in the main combustion chamber. For controlling the temperature of the middle electrode 22, what has been noted earlier in connection with FIG. 1 applies here as well. Specifically, here again the electrode can be heated up to the optimum temperature with the aid of an additional heating device in the case of cold starting, idling, or partial-load operation.

In the embodiment shown in FIG. 5, which has been simplified in comparison with the embodiments shown in FIGS. 1–4, an ignition chamber 14" having an approximately circular cross section is provided. A discharge channel 15" discharges into the ignition chamber 14" in tangential fashion relative to the circular cross section. This discharge channel 15" connects the ignition chamber 14" with the main combustion chamber 4 and has the same function as the discharge channels 15 and 15' described above. Approximately opposite the entry opening of the channel 15", an ignition device 18" of the type described above is inserted into the wall of the ignition chamber. The middle electrode 22, embodied as a heat pipe, here protrudes diametrically through the ignition chamber, and the electrode tip 35 terminates in close proximity to the wall of the ignition chamber in the wall region surrounding the discharge channel and there forms a spark gap 24 with the ignition chamber wall when voltage is applied. The closeness of the spark gap to the fresh mixture entering from the main combustion chamber provides the advantages discussed in connection with the foregoing exemplary embodiments. It is favorable that the spark gap is shifted into the region of calmer flow rather than being located in the open stream of the fresh mixture flowing in. Thus, in the mixture which can be warmed up at the middle electrode, an improved ignitability is attained. The flow in the direction of the arrow which is brought about in the ignition chamber arrives at the point of ignition without interference, as a result of embodying the ignition device according to the invention.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An ignition chamber insert, comprising an elongated interiorly and exteriorly threaded body portion, said exteriorly threaded portion arranged to merge with a smooth surface portion capable of being received in sealing relation with means defining an aperture in an engine block, an electrode, an insulating body surrounding a portion of said electrode, said insert further including at least at one end, a centrally disposed aperture in said at least one end which receives said electrode of an ignition device in spaced relation therewith, another open end in said insert to receive said ignition device and a heating element in a chamber in said insert, said electrode is embodied as a slender heat pipe which extends from said insulating body into said aperture and said electrode is operated at a temperature below a glow ignition temperature and said heating element is disposed about said insulating body.

2. An ignition chamber insert for assembly with the main combustion chamber wall of an internal combustion engine, said ignition chamber insert including an ignition chamber having at least one primary discharge channel through said wall connecting said ignition chamber with said main combustion chamber and for passing an operating fuel-air mixture from said main combustion chamber to said ignition chamber, said ignition chamber insert having a spark-ignition device connectable to a voltage source and further including a first electrode said first electrode including a portion that extends through said ignition chamber including an end which forms a spark gap with said wall when voltage is applied, characterized in that said first electrode is embodied as a heat pipe, an insulating body surrounding a portion of said heat pipe, said heat pipe including a portion extending from said insulating body and arranged to protrude through the ignition chamber with its end in the vicinity of said wall area which surrounds said discharge channel and at that point said heat pipe end is at the shortest distance from the wall of the ignition chamber, thereby determining the location of the ignition spark whereby the temperature for cooling purposes at which said heat pipe operates to conduct heat from said end which protrudes through said insulating body to said insulator is below an auto-ignition temperature of the operating fuel-air mixture and the length of said heat pipe relative to its diameter is several times the diameter.

3. An ignition chamber insert as defined by claim 2, characterized in that said ignition chamber is embodied as rotationally symmetrical and said spark ignition device is capable of being inserted coaxially into said ignition chamber insert and further that said discharge channel is coaxial with said first electrode of said spark ignition device.

4. An ignition chamber insert as defined by claim 3, characterized in that said coaxial discharge channel is surrounded by a plurality of supplemental discharge channels which are located in a plane perpendicular to the axis of said electrode.

5. An ignition chamber insert as defined by claim 4, characterized in that said partial discharge channels are disposed tangentially relative to said discharge channel which is coaxial with the first electrode.

6. An ignition chamber insert as defined by claim 4, characterized in that at least a portion of said discharge channels which surround said primary discharge channel are disposed in such a manner that the axes thereof intersect said axes of said partial discharge channels in said main combustion chamber.

7. An ignition chamber insert as defined by claim 4, characterized in that said discharge channel further includes a constricted zone in proximity to said first electrode for the purpose of fixing the ignition spark location.

8. An ignition chamber insert as defined by claim 7, characterized in that said electrode has a portion protruding into said primary discharge channel which is coaxial therewith said portion being approximately as long as the portion of the electrode which protrudes freely through said ignition chamber.

9. An internal combustion engine or ignition chamber insert as defined by claim 8, characterized in that said first electrode is thickened at the narrowest point between said ignition chamber wall and said electrode which thickening is embodied as an inwardly directed thickening of said end of said heat pipe.

10. An internal combustion engine with externally supplied ignition comprising one main combustion chamber per cylinder and one ignition chamber per cylinder, said ignition chamber having a wall region associated with the main combustion chamber, said ignition chamber communicating with said main combustion chamber via at least one discharge channel in said wall region, said ignition chamber further being capable of being supplied via said at least one discharge channel with an operating fuel-air mixture and further comprising a spark-ignition device said spark ignition device comprising a first electrode which forms an ignition gap with said wall of said ignition chamber an insulating body surrounding a portion of said first electrode, characterized in that said first electrode is embodied as a heat pipe arranged with an end which protrudes through said insulating body and said ignition chamber into the vicinity of said wall region which surrounds said discharge channel and at this point said heat pipe is at the shortest distance from said wall region of the ignition chamber, thereby determining the location of the ignition spark whereby the temperature for cooling purposes at which said heat pipe operates to conduct heat from said end which protrudes through said insulating body to said insulator is below an auto-ignition temperature of the operating fuel-air mixture and the length of said heat pipe relative to its diameter is several times the diameter.

11. An ignition chamber insert as defined by claim 10 or 2, characterized in that said first electrode can be additionally warmed up by means of a heating device carried by said insert, whereby said electrode can be pre-heated on starting and low-load operation of said engine.

* * * * *